March 17, 1959 J. H. HACKENBERG ET AL 2,878,095
FACSIMILE SCANNING DRUM SHEET HOLDER APPARATUS
Filed Jan. 7, 1953 3 Sheets-Sheet 1
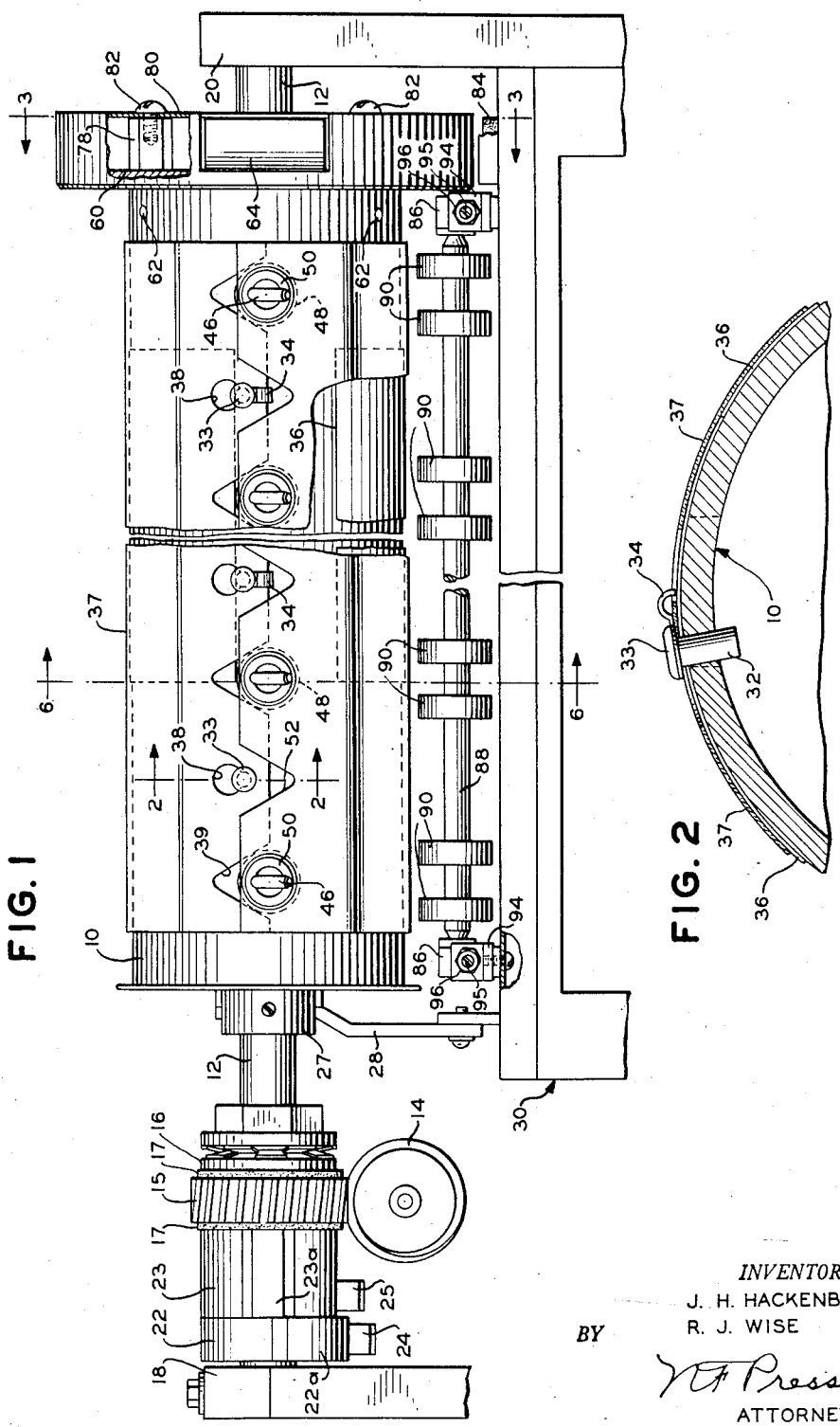
INVENTORS
J. H. HACKENBERG
R. J. WISE
BY
ATTORNEY March 17, 1959　　J. H. HACKENBERG ET AL　　2,878,095
FACSIMILE SCANNING DRUM SHEET HOLDER APPARATUS
Filed Jan. 7, 1953　　3 Sheets-Sheet 2

INVENTORS
J. H. HACKENBERG
R. J. WISE
BY
*Presson*
ATTORNEY

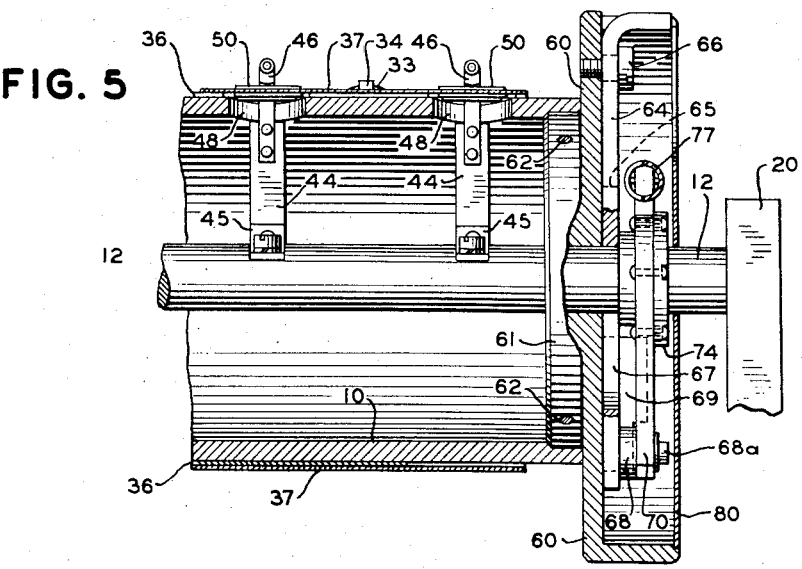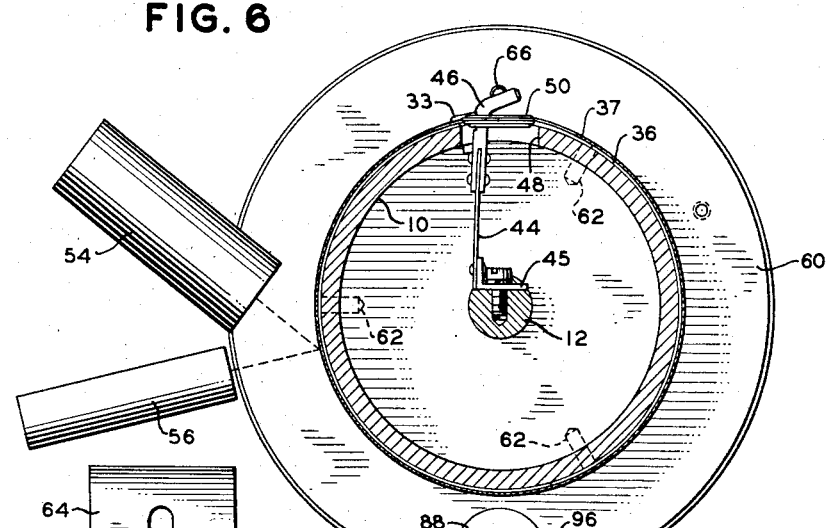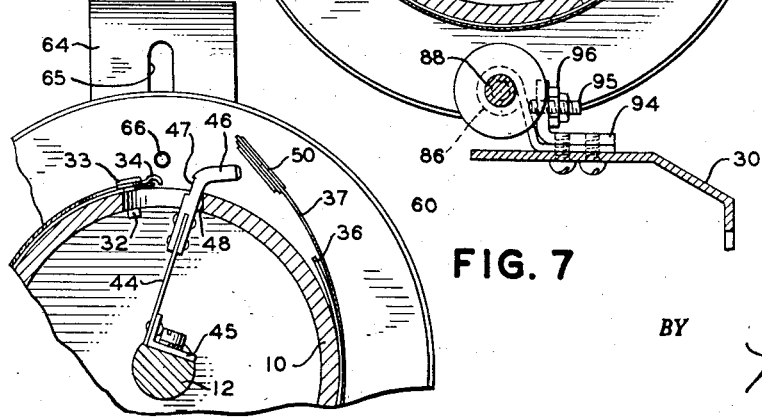

United States Patent Office 2,878,095
Patented Mar. 17, 1959

2,878,095

FACSIMILE SCANNING DRUM SHEET HOLDER APPARATUS

John H. Hackenberg, Flushing, N. Y., and Raleigh J. Wise, Arlington, N. J., assignors to The Western Union Telegraph Company, New York, N. Y., a corporation of New York Application January 7, 1953, Serial No. 330,003

7 Claims. (Cl. 346—138)

This invention relates to facsimile scanning apparatus and more particularly to apparatus for mounting and holding a message blank or other sheet of copy bearing subject matter to be scanned during a transmitting operation.

It has heretofore been proposed to mount the sheet of copy to be transmitted on the scanning drum of a facsimile transmitter by means of an overlying wrapper comprising a sheet of transparent material which is permanently fastened at the leading edge thereof along the drum, the opposite or trailing edge of the sheet being frictionally held by a clamping bar or similar device that engages the drum. The prior devices, however, have been subject to several disadvantages, among which are that it is difficult to clean or replace the transparent wrapper when it becomes dirty, scratched or otherwise damaged in service; the wrapper may become deformed in service so that all portions of the underlying sheet of copy are not held tightly against the drum and in proper focus with respect to the lens system of the scanning photocell; if the sheet of copy was creased or wrinkled prior to insertion beneath the transparent wrapper, this resulted in some distortion in the transmitted message; and the sheet of copy which could be used was generally limited to thin paper.

Among the objects of the instant invention are to provide copyholder apparatus in which the wrapper may readily be removed for inspection, cleaning or replacement purposes; the apparatus enables copy comprised of either light or stiff paper and even light cardboard to be used; the wrapper is held under resilient tension against the copy so that all portions of the copy are caused to lie flat against the surface of the scanning drum and in proper focus; the trailing edge of the wrapper may automatically be fastened by rotation of the scanning drum; wrinkles or creases in the sheet of copy are substantially smoothed out automatically by application of resilient tension applied to the trailing edge of the wrapper; and means are provided whereby the drum is held in a predetermined arcuate position in the direction of rotation thereof to enable proper orientation of the sheet of copy when it is inserted preparatory to a scanning operation, and to facilitate its removal after scanning is completed.

Other objects and advantages of the invention will be apparent from the following detailed description of an illustrative embodiment of the apparatus, taken in connection with the accompanying drawings, in which:

Fig. 1 is a front view of the copyholding drum in a facsimile transmitting machine embodying the principles of the instant invention;

Fig. 2 is an enlarged fragmentary view, taken along the line 2—2 of Fig. 1, showing details of certain of the fastening members employed;

Fig. 5 is a sectional view taken along the line 5—5 of Fig. 3;

Fig. 6 is a cross-sectional view taken along the line 6—6 of Fig. 1, with the drum structure rotated through an angle of approximately ninety degrees; and Fig. 7 is a fragmentary view showing details of wrapper clamp elements.

Figure 3:
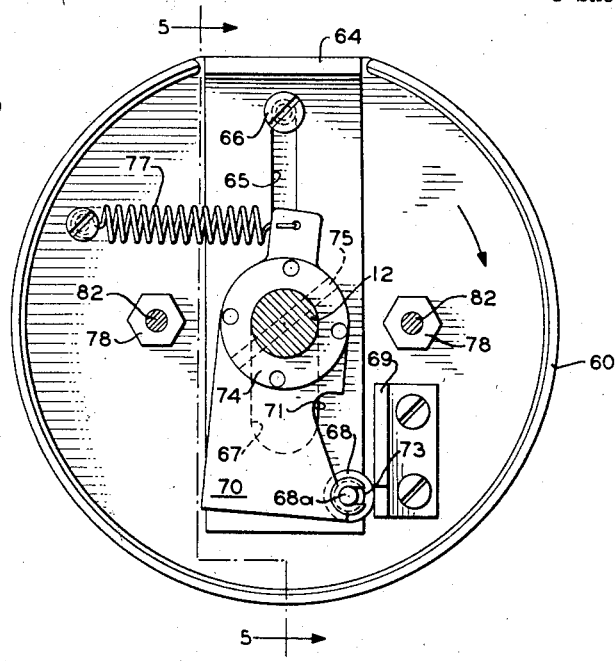
Fig. 3 is a cross-sectional view taken along the line 3—3 of Fig. 1, except that the drum structure has been rotated through an angle of approximately ninety degrees in order to show certain structural details.

Referring to Fig. 1 of the drawings, there is shown a facsimile transmitting scanning apparatus in which the copy sheet is mounted on a rotatable drum in accordance with the principles of the instant invention. Various types of scanning apparatus of this character are well known in the art, and Fig. 1 illustrates but one of many known forms of the scanning apparatus per se. The drum 10 is rotatably mounted as hereinafter described, and is driven by means including a shaft 12, the shaft being driven by a motor (not shown) through a driving gear 14 and a driven gear 15, driving being effected through a friction slip clutch including members 15, 16, 17 and 23 in known manner. The shaft 12 is journalled at its ends in bearings 18 and 20. On the left hand end of the shaft, and as seen in the figure, there are mounted cams 22 and 23 rotatable with the shaft and respectively having cam surfaces 22a and 23a which control electrical contact members 24 and 25. The elements 22, 22a and 24 are for the purpose of transmitting facsimile phasing signals to the distant receiver, and elements 23, 23a and 25 are for the purpose of generating blanking signals which prevent the transmission of facsimile pickup signals during the time that the overlapped portions of the wrapper sheet 37 are being scanned by the photocell or other signal pickup means, in known manner. A collar 27 secured by a screw to the shaft 12, coacts with a collar 74 shown in Figs. 3 to 5, to position the drum longitudinally on the shaft. A brake (not shown) carried by a flat spring member 28, Fig. 1, operates to take up backlash in the driving gears 14 and 15.

Mounted transversely along the drum surface are fastening means, for example, such as studs or pins 32, shown in detail in Fig. 2, which have enlarged heads 33. The sheet of copy 36 bearing the subject matter to be transmitted is held against the surface of the drum 10 by means of the flexible wrapper 37. This wrapper may be composed of any suitable plastic, for example, acetate, and preferably is clear in color. In the form shown the thickness of the sheet is approximately 0.0075 of an inch. The leading edge of the transparent wrapper has perforations such as holes 38 therein, Fig. 1, these perforations being sufficiently large in diameter so that they may be inserted over the heads 33 of the fastening studs 32 and held under the heads. Small spring clip members 34 are mounted under the heads of certain of the studs 32, and prevent the leading edge portion of the wrapper 37 from accidentally becoming disengaged from the studs. However, the leading edge may be slid backwards from under the clips 34 to enable ready removal of the wrapper for cleaning or replacement purposes. Notched portions 39 in the leading edge of wrapper 37 provide clearance for the fastening means for the trailing edge of the wrapper.

The fastening means for the trailing edge of the wrapper, shown in detail in Figs. 5 to 7, preferably comprise flat metal leaf springs 44 which are clamped at their fixed ends by means of bracket members 45 secured to the shaft 12. The free ends of members 44 have fastening hooks 46 secured thereto, as by rivets, and these fastening hooks extend through apertures 48 in the drum 10, these apertures being sufficiently elongated to provide for back and forth movement of the fastening hooks from their latching position, seen in Figs.

1 and 6, to their releasing position shown in Fig. 7. These fastening hooks are spaced longitudinally along the drum in a manner to receive apertured portions comprising holes extending along the trailing edge of the transparent wrapper, these apertured portions preferably being protected by grommets or other forms of eyelets 50. The latching members 46 have notched portions 47 which form shoulders, as seen in Fig. 7, and the grommets 50 of the wrapper are adapted to slide over the sloping end portions of the members 46 and engage in the notched portions 47 and under the shoulders, thereby to provide positive locking means for the trailing end of the wrapper. Fig. 7 shows the trailing edge of the wrapper before it is placed over the hooks 46, and Fig. 6 shows the trailing edge with the perforated portions thereof in latched position, at which time the fastening hooks 46 have been rotated to their locking position by manually rotating the shaft 12 relative to the drum 10 in a manner hereinafter described.

In the locking position the steel spring members 44 cause the fastening hooks to maintain resilient pulling tension on the wrapper for resiliently tensioning the latter against the sheet of copy 36. This tensioning force causes the copy sheet 36 to be smoothed or ironed out so that all portions of the copy sheet lie flat against the surface of the drum and in proper focus with respect to a scanning light embodied within a housing 54, Fig. 6, and the pickup photocell enclosed within a housing 56. Due to the considerable tension thus applied and maintained, the sheet of copy may vary in thickness and flexibility and even light cardboard may be employed as the copy sheet. The trailing edge of the wrapper has V-shaped apertured portions 52 therein to provide clearance for the fastening members 32 and enable a desired slight overlap of the leading and trailing edges of the wrapper.

Figure 4:
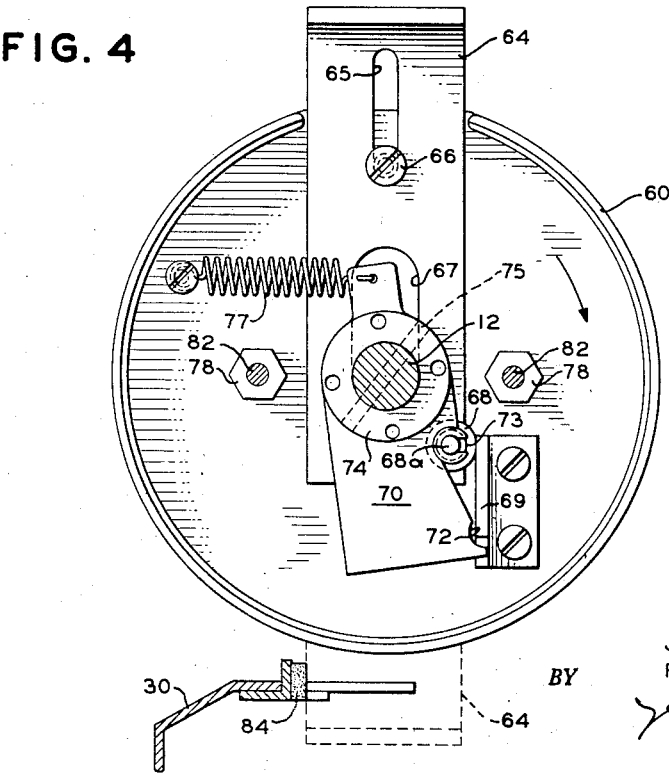
Fig. 4 is a view similar to Fig. 3, with the fastening means for the transparent wrapper in released position.

Referring to Figs. 1 and 3 to 5, a cylindrical housing 60, which is mounted on the right hand end of the scanning drum 10, carries a clamp assembly through which the drum is driven by the shaft 12. The housing 60 is mounted by means of a circular flange portion 61, Fig. 5, secured by rivets or pins 62 to the inner surface of the drum. The assembly includes a wrapper control lever 64 which has a slotted portion 65, Figs. 3 and 4, and a slotted portion 67. The control lever is mounted to be manually slidable, upwardly and downwardly, as seen in Figs. 3 and 4, the limit of travel of the lever being determined by the stud or screw 66 which engages the slotted portion 65 at each end of its movement. Fig. 3 shows the lever pressed downwardly in the latching position of the clamping members 46, and Fig. 4 shows the lever up in releasing position of the members 46, at which time the trailing end of the wrapper may manually be fastened or released, as will be seen from Fig. 7. Referring again to Figs. 3 to 5, it will be seen that the slotted portion 67 of lever 64 enables upward or downward movement of the lever with respect to the drum shaft 12, and the lower end of the wrapper control lever carries a roller 68 which is mounted on a pin 68a secured to the lever. A camming member 73 also is secured on the pin 68a. The roller 68 coacts with a guide member 69 that is secured to the housing 60. Mounted on the shaft 12 is a drum cam 70 which has a camming surface that terminates in notches 71 and 72, the drum cam being mounted by means of a collar 74 which is secured by a pin 75 to the shaft 12. A strong spring 77 urges the drum cam 70 in a direction such that it is maintained in contact with the cam roller 73. Hexagonal studs 78, Figs. 3 to 5, are secured to the housing 60 as by welding or in any other suitable manner, and space a cover plate 80 which is secured to the housing 60 by screws 82 that are threaded into the studs 78.

When the drum 10 is stationary, and prior to a scanning operation, the wrapper control lever 64 is manually raised upwardly, which causes the drum cam 70 to rotate from the position shown in Fig. 3 to that shown in Fig. 4 so that the drum shaft 12 is rotated, in a counterclockwise direction as seen in the figures, relative to the drum 10, to the loading position which is shown more clearly in Fig. 7. The sheet of copy is inserted beneath the wrapper, with the subject matter thereon facing outwardly. The insertion of the sheet of the copy 36 to a desired position on the drum is facilitated merely by sliding the copy until its leading edge engages the studs 32, as seen in Fig. 2. The wrapper control lever 64 then is manually pushed downwardly against the tension of the spring 77 to the position shown in Fig. 3, which causes the drum shaft 12 to be rotated in a clockwise position with respect to the drum, to the latching position seen more clearly in Figs. 1 and 6, although the trailing edge of the wrapper has not yet been latched.

The drum now is manually rotated until the perforated portions of the trailing edge of the wrapper are in position to be slid over the inclined end portions of the fastening hooks 46. Mounted on the base 30, Fig. 1, are two bearings 86 which carry a freely rotatable shaft 88. The shaft has pairs of actuating members 90 secured thereto at spaced intervals to match with the perforations in the trailing edge of the wrapper. These actuating members preferably, although not necessarily, are in the form of rollers. When the drum is rotated to a point where the eyelets 50 contact the aligned pairs of rollers 90, the latter move the eyelets over the inclined ends of the fastening hooks 46 and into the notched portions thereof and are locked by the shoulders formed by the notched portions, whereby the latching or locking operation is automatically effected by rotation of the drum. The resiliency of the spring mountings for the fastening hooks enable the eyelets 50 to slide over the sloping portions of the hooks and into the locking notches. Fig. 6 shows details of one of the bearings 86, in which a bracket member 94 is secured to the base 30 by the same screws which mount the bearing member. Each bracket 94 has an upstanding portion which carries a threaded stud 95 one end of which bears against the supporting strip that forms the bearing member 86. By rotating the stud 95, the supporting strip of bearing member 86 is adjusted to a position which gives the desired spacing between the rollers 90 and the drum 10 thereby to insure that the eyelets will be inserted properly in the notched portions 47 of the fastening hooks 46. This supporting strip of the bearing 86 is of steel and has sufficient resiliency to enable the adjustment to be made. An elastic stop nut 96 maintains the desired adjustment effected by the threaded stud 95. The spacing between the rollers 90 and the surface of the drum is not critical, but is such that the wrapper grommets are caused to snap over the ends of the hooks 46 and into the notched portions 47, although this spacing is sufficiently great to provide ample clearance between the fastened wrapper including the grommets and the rollers, whereby there is no contact with the rollers during a scanning operation. In the embodiment shown a spacing of approximately 3/32" has been found sufficient.

After a scanning operation has been effected and the drum has come to rest, the wrapper control lever 64 manually is pulled upward thereby to enable ready release of the eyelets 50 from the fastening members 46. The released trailing edge of the wrapper is then grasped by the operator and pulled outwardly and the drum rotated, through the friction clutch hereinbefore described, until the extending wrapper control lever engages a stop member 84, Fig. 4, mounted on the base 30, the position of the control lever at this time being indicated by broken lines in the figure. This stops the drum in a desired position for removing the sheet of copy, i. e., unloading the drum, and also for loading the drum with a new sheet of copy to be transmitted.

For brevity in the specification and claims the term "transparent" as applied to the wrapper is employed in a generic sense to define a sheet, whether clear or colored, through which the marked and unmarked elemental areas on the copy may be discerned sufficiently to enable the photocell of the scanning apparatus to pick up the desired signals.

While there is shown and described herein one illustrative embodiment of the invention, many other and varied forms will present themselves to those versed in the art without departing from the invention, and the invention is therefore not limited except as indicated by the scope of the appended claims.

What is claimed is:

1. In facsimile scanning apparatus in which a sheet of copy to be scanned is held on the surface of a rotatable drum by an overlying transparent wrapper carried by the drum, means for releasably fastening the leading edge of the wrapper to and along the drum, said wrapper having perforated portions along the trailing edge thereof, means for releasably fastening the trailing edge of said wrapper along said drum including a group of resilient fastening members carried by the drum and having end portions for receiving said perforated portions, said group of fastening members having a tensioning position, and means for actuating the group of fastening members to said tensioning position to maintain resilient pulling tension on the wrapper acting circumferentially around the drum in the direction of wrapping for tensioning the latter against said sheet of copy, said end portions having means for latching said perforated portions of the wrapper in engagement therewith.

2. Apparatus according to claim 1, in which said latching means comprises shoulders formed on said end portions for receiving and overlying said perforated portions of the wrapper.

3. Apparatus according to claim 1, in which said end portions of the fastening members are inclined at an angle which facilitates their engagement by said perforated portions of the wrapper.

4. In facsimile scanning apparatus in which a sheet of copy to be scanned is held on the surface of a rotatable drum by an overlying transparent wrapper carried by the drum, means for releasably fastening the leading edge of the wrapper to and along the drum, said wrapper having perforated portions along the trailing edge thereof, means for releasably fastening the trailing edge of said wrapper along said drum including resilient fastening members carried by the drum and having end portions for receiving said perforated portions, means operative to cause said fastening members to maintain resilient tension on the wrapper for tensioning the latter against said sheet of copy, and actuating means mounted adjacent to and longitudinally along said drum and positioned to engage said perforated portions and slide them on said end portions of the fastening members when the drum is rotated.

5. Apparatus according to claim 4, in which said actuating means comprise a plurality of rotatable members which respectively engage said perforated portions and slide them on the end portions of the fastening members.

6. Apparatus according to claim 4, including adjustable mounting members for said actuating means whereby the spacing between said means and the surface of the drum may be adjusted to an optimum value.

7. Apparatus according to claim 4, in which said perforated portions have eyelets and said actuating means engages the eyelets for sliding them on said end portions of the fastening members.

References Cited in the file of this patent

UNITED STATES PATENTS

| | | |
|---|---|---|
| 2,356,999 | Hogan | Aug. 29, 1944 |
| 2,514,974 | Schaver | July 11, 1950 |
| 2,622,000 | Thompson | Dec. 16, 1952 |
| 2,716,153 | Magnusson | Aug. 23, 1955 |

FOREIGN PATENTS

| | | |
|---|---|---|
| 874,684 | France | May 18, 1942 |
| 688,022 | Germany | Feb. 10, 1940 |